United States Patent
Takeuchi

(10) Patent No.: US 9,083,835 B2
(45) Date of Patent: Jul. 14, 2015

(54) IMAGE READING APPARATUS, CONTROL APPARATUS AND METHOD, AND COMPUTER READABLE MEDIUM STORING PROGRAM FOR IMPLEMENTING A POWER SAVING TECHNIQUE

(75) Inventor: Hideo Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 817 days.

(21) Appl. No.: 13/092,644

(22) Filed: Apr. 22, 2011

(65) Prior Publication Data

US 2012/0127537 A1 May 24, 2012

(30) Foreign Application Priority Data

Nov. 19, 2010 (JP) ................................. 2010-259119

(51) Int. Cl.
*H04N 1/32* (2006.01)
*G06F 1/00* (2006.01)
*H04N 1/00* (2006.01)

(52) U.S. Cl.
CPC ....... *H04N 1/00888* (2013.01); *H04N 1/00904* (2013.01)

(58) Field of Classification Search
USPC .................. 358/442, 488; 713/300, 320, 324; 399/88
See application file for complete search history.

(56) References Cited

U.S. PATENT DOCUMENTS

| 2003/0145219 A1* | 7/2003 | Cossel et al. .................. 713/200 |
| 2006/0193013 A1* | 8/2006 | Hoshi .......................... 358/474 |
| 2007/0206211 A1* | 9/2007 | Okutsu et al. ................ 358/1.14 |
| 2008/0266588 A1 | 10/2008 | Inaba |
| 2010/0218025 A1* | 8/2010 | Saito ............................. 713/324 |

FOREIGN PATENT DOCUMENTS

| JP | 08204863 A | 8/1996 |
| JP | 2000125030 A | 4/2000 |
| JP | 2001127851 A | 5/2001 |
| JP | 2004-266661 A | 9/2004 |
| JP | 2008-160524 A | 7/2008 |

OTHER PUBLICATIONS

CS 150 Fall 2005 Lecture #3 Programmable Logic, Univ. California, Berkeley, Sep. 19, 2006.*
English-language translation of Communication dated Oct. 28, 2014 from the Japanese Patent Office in counterpart Japanese Patent Application No. 2010-259119.

* cited by examiner

*Primary Examiner* — Barbara Reinier
(74) *Attorney, Agent, or Firm* — Sughrue Mion, PLLC

(57) ABSTRACT

An image reading apparatus used for an image forming apparatus that is coupled therewith and that has a main controller which performs control of the image forming apparatus includes an image reading unit, a detector, and a communication controller. The image reading unit reads an image formed on a document. The detector detects a state of the image reading unit. The communication controller connects to the main controller, the detector, and a communication line. Power is supplied to the detector and the communication controller in both a first operating state, in which supply of power to the main controller is stopped, and a second operating state, in which power is supplied to the main controller. The detector transmits a detection signal to the communication controller in the first operating state, and transmits the detection signal to the main controller in the second operating state.

15 Claims, 7 Drawing Sheets

FIG. 5

| MODE | IMAGE FORMING UNIT | | IMAGE READING UNIT | UI UNIT | FAX UNIT | SYSTEM CONTROL UNIT | | AUTHENTICATION UNIT | DETECTOR |
|---|---|---|---|---|---|---|---|---|---|
| | IMAGE FORMING CONTROLLER | OTHERS | | | | COMMUNICATION CONTROLLER | CENTRAL CONTROLLER | | |
| COPY MODE | ○ | ○ | ○ | ○ | ○ | ○ | ○ | ○ | ○ |
| PRINT MODE | ○ | ○ | × | ○ | ○ | ○ | ○ | ○ | ○ |
| SCAN MODE | × | ○ | ○ | ○ | ○ | ○ | ○ | ○ | ○ |
| STANDBY MODE | × | ○ | × | ○ | ○ | ○ | ○ | ○ | ○ |
| SLEEP MODE | × | × | × | × | ○ | ○ | × | × | ○ |
| TUNE OFF SWITCH | × | × | × | × | × | × | × | × | × |

○ : SUPPLY POWER    × : STOP SUPPLY OF POWER

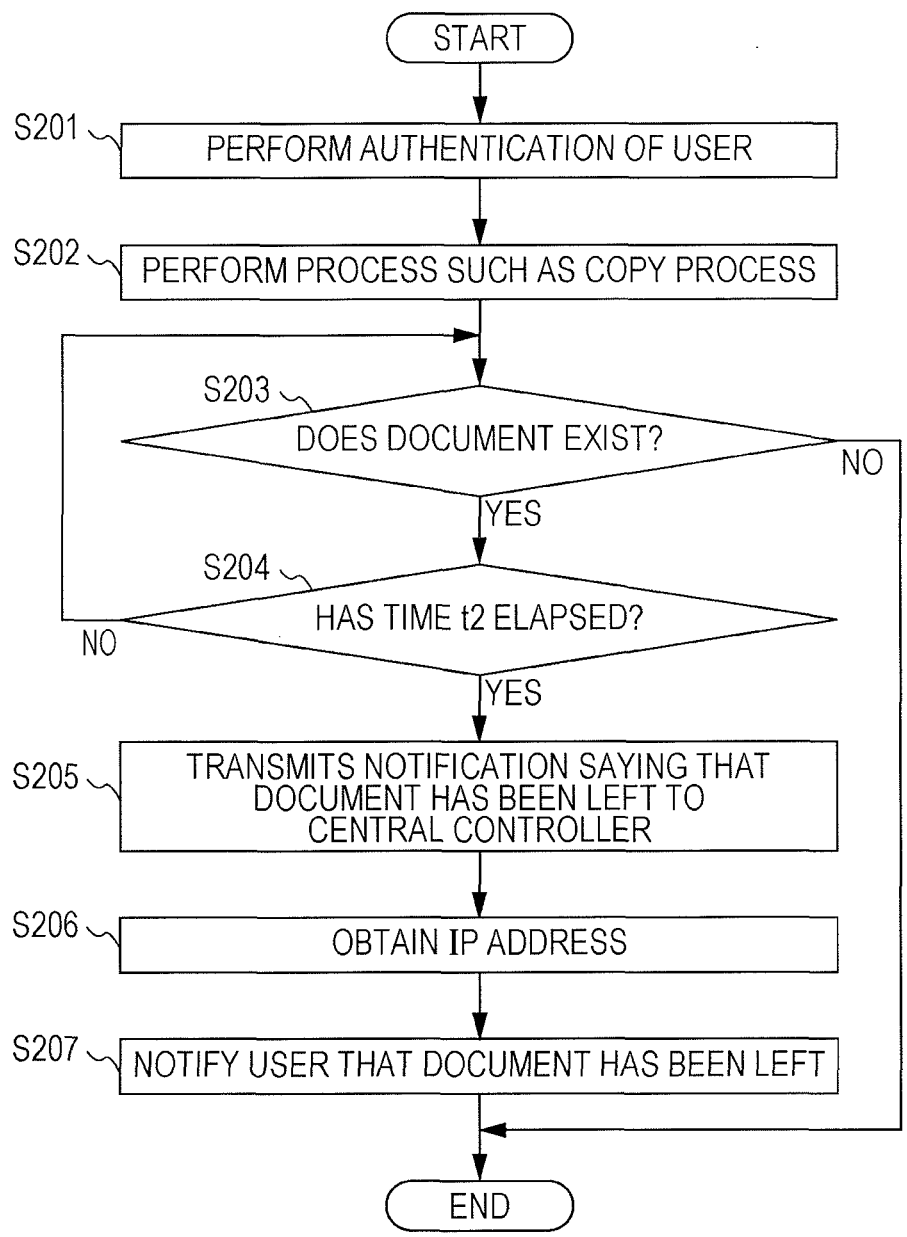

IMAGE READING APPARATUS, CONTROL APPARATUS AND METHOD, AND COMPUTER READABLE MEDIUM STORING PROGRAM FOR IMPLEMENTING A POWER SAVING TECHNIQUE

CROSS-REFERENCE TO RELATED APPLICATIONS

This application is based on and claims priority under 35 USC 119 from Japanese Patent Application No. 2010-259119 filed Nov. 19, 2010.

BACKGROUND

(i) Technical Field

The present invention relates to an image reading apparatus, a control apparatus and method, and a computer readable medium storing a program.

Hitherto, image reading apparatuses that read image information of sheets of paper on which images are formed have been used as copiers, facsimiles, scanners used for inputs to computers, and so forth. In such an image reading apparatus, a sheet of paper is irradiated with light emitted from a light source that is disposed along a transport path along which the sheet of paper is transported, and light reflected by the sheet of paper is received by an image sensor, thereby reading an image formed on the sheet of paper.

SUMMARY

According to an aspect of the invention, there is provided an image reading apparatus used for an image forming apparatus that is coupled therewith and that has a main controller which performs control of the image forming apparatus. The image reading apparatus includes an image reading unit, a detector, and a communication controller. The image reading unit reads an image formed on a document. The detector detects a state of the image reading unit. The communication controller connects to the main controller, the detector, and a communication line. Power is supplied to the detector and the communication controller in both a first operating state, in which supply of power to the main controller is stopped, and a second operating state, in which power is supplied to the main controller. The detector transmits a detection signal to the communication controller in the first operating state, and transmits the detection signal to the main controller in the second operating state.

BRIEF DESCRIPTION OF THE DRAWINGS

Exemplary embodiment(s) of the present invention will be described in detail based on the following figures, wherein:

FIG. 5 is a diagram for explaining operating modes that are set in the image forming apparatus to which the image reading unit in the present exemplary embodiment is applied;

FIG. 7 is a flow diagram for explaining a case in which a notification is provided from the image forming apparatus to a user when the user has left a document on a reading section of the image reading unit.

DETAILED DESCRIPTION

Hereinafter, exemplary embodiments of the present invention will be described in detail with reference to the accompanying drawings.
Overall Description of Image Forming Apparatus Hereinafter, an exemplary embodiment will be described in detail with reference to the accompanying drawings.

Figure 1:
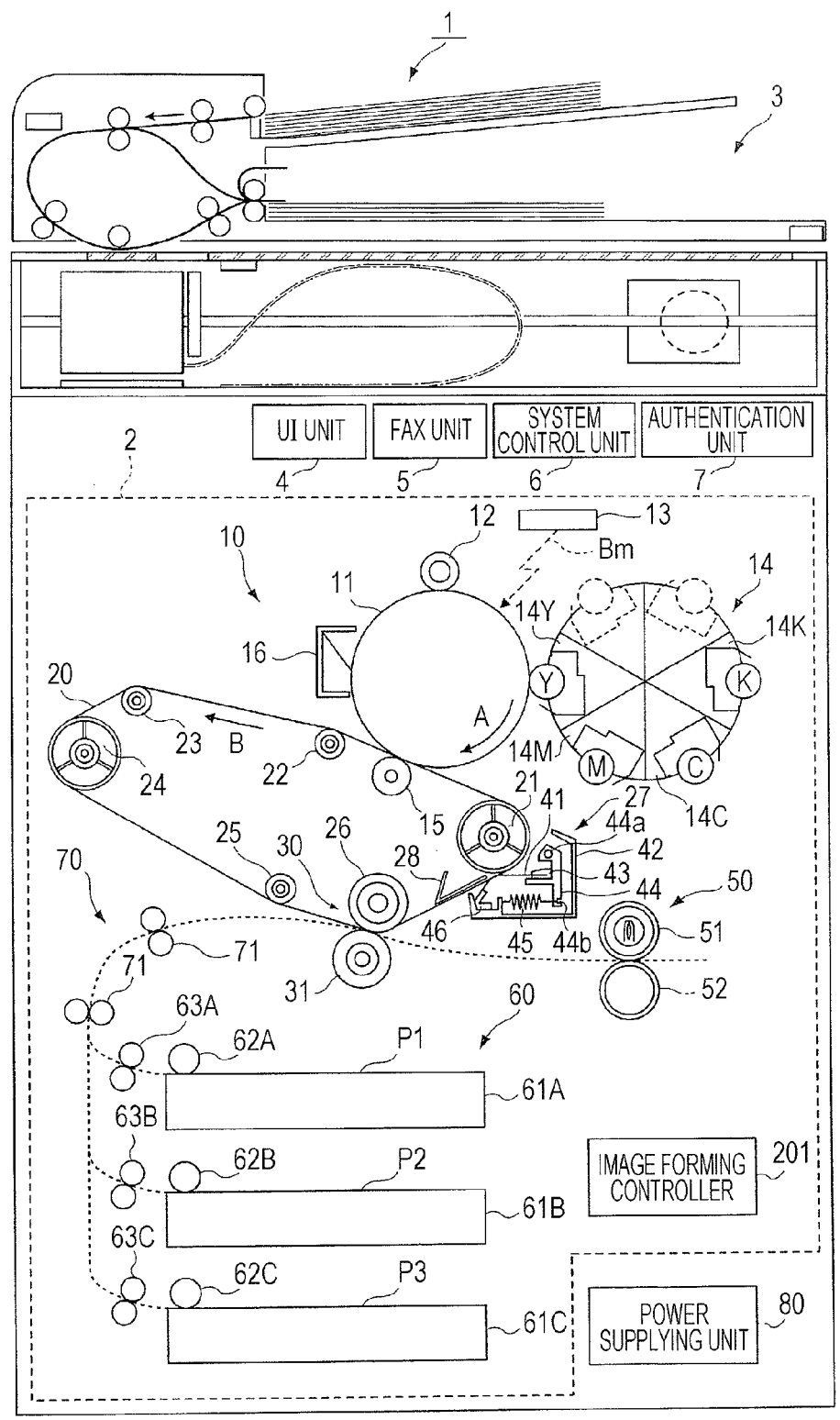
FIG. 1 illustrates an overall configuration of an image forming apparatus to which an image reading unit in the present exemplary embodiment is applied.

FIG. 1 illustrates an overall configuration of an image forming apparatus to which an image reading unit in the present exemplary embodiment is applied.

An image forming apparatus 1 in the present exemplary embodiment includes an image forming unit 2, an image reading unit 3, a user interface (UI) unit 4, a facsimile (FAX) unit 5, a system control unit 6, and an authentication unit 7. The image forming unit 2 serves as an example of an image forming unit that forms an image on a sheet of paper, which is an example of a recording material, on the basis of image data regarding the image having individual colors. The image reading unit 3 serves as an example of an image reading unit that reads an image formed on a document. The UI unit 4 receives an operation input from a user, and displays various types of information for a user. The FAX unit 5 transmits and receives a fax via a communication line L. The system control unit 6 controls, for example, an operation of the entire image forming apparatus 1 and communication via the communication line L. The authentication unit 7 serves as an example of an authentication unit that performs authentication of a user who uses the image forming apparatus 1.

Furthermore, the image forming apparatus 1 includes a power supplying unit 80 that supplies power to each of the units, and an image forming controller 201 that controls an operation of the entire image forming unit 2.
Description of Image Forming Unit Here, the image forming unit 2 in the present exemplary embodiment includes a process section 10. The process section 10 includes, for example, a photoconductor drum 11, an intermediate transfer belt 20, a second transfer part 30, and a fixing part 50. The photoconductor drum 11 serves as an image carrier that is rotatably disposed in the direction indicated by an arrow A. The intermediate transfer belt 20 serves as a transfer material which is rotatably disposed in the direction indicated by an arrow B, and onto which toner images having individual color elements formed on the photoconductor drum 11 are sequentially transferred (first transfer) and held. The second transfer part 30 collectively transfers (second transfer) the overlapping toner images, which have been transferred onto the intermediate transfer belt 20, onto a sheet of paper P that is a recording material. The fixing part 50 serves as an example of a fixing part (a fixing device) that fixes the toner images, which have been subjected to second transfer, on the sheet of paper P. Furthermore, the image forming unit 2 includes a paper storage section 60 that stores sheets of paper P1 to P3 as sheets of paper P, and a paper transport section 70 that transports a sheet of paper P from the paper storage section 60 to the process section 10.

Devices that are used for electrophotography are sequentially disposed around the photoconductor drum 11. The devices are, for example, a charging roller 12, a laser exposure device 13, a rotary developing device 14, a first transfer roller 15, and a cleaning blade 16. The charging roller 12 serves as a contact charging member that charges the photoconductor drum 11. The laser exposure device 13 serves as a toner-image forming part that forms electrostatic latent images on the photoconductor drum 11 (in FIG. 1, an exposure beam is denoted by reference numeral Bm). Developing parts 14Y, 14M, 14C, and 14K are rotatably attached to the rotary developing device 14. The developing parts 14Y, 14M, 14C, and 14K serve as developing parts in which toner of individual color elements of yellow (Y), magenta (M), cyan (C), and black (K) is stored and which visualize the electrostatic latent images, which have been formed on the photoconductor drum 11, using the toner. The first transfer roller 15 serves as a transfer part that transfers the toner images having the individual color elements, which have been formed on the photoconductor drum 11, onto the intermediate transfer belt 20. The cleaning blade 16 collects toner having an opposite polarity, which is opposite to a typical polarity, out of the residual toner remaining on the photoconductor drum 11.

Here, regarding the charging roller 12, an epichlorohydrin robber layer is formed on the surface of a metallic shaft. Furthermore, the surface of the epichlorohydrin robber layer is coated with polyamide containing electrically conductive powder of tin oxide so that the thickness of the coating layer made of polyamide is about 3 μm. Note that, in the present exemplary embodiment, the charging roller 12 may be a scorotron-type charging device.

Moreover, regarding the photoconductor drum 11, an organic photosensitive layer is formed on the surface of a metallic thin drum having a cylindrical shape. The organic photosensitive layer is formed of a material that is to be charged so as to have a negative polarity. Development performed by the developing parts 14Y, 14M, 14C, and 14K is performed using a reversal development scheme. Accordingly, the toner used in the developing parts 14Y, 14M, 14C, and 14K is a type of toner that is to be charged so as to have a negative polarity. A charge bias power supply (not illustrated) for applying a predetermined charge bias to the charging roller 12 is connected to the charging roller 12. A development bias power supply (not illustrated) for applying a predetermined development bias to the individual developing parts 14Y, 14M, 14C, and 14K is connected to the rotary developing device 14. A first transfer bias power supply (not illustrated) for applying a predetermined first transfer bias to the first transfer roller 15 is connected to the first transfer roller 15. Furthermore, a developing-device driving motor (not illustrated) for causing a predetermined developing part to face the photoconductor drum 11 by rotation is attached to the rotary developing device 14. Note that the photoconductor drum 11 is grounded. Note that, in the image forming apparatus 1 in the present exemplary embodiment, it may be considered that a toner-image forming unit that forms toner images is configured so as to include the photoconductor drum 11, the charging roller 12, the laser exposure device 13, and the rotary developing device 14.

The intermediate transfer belt 20 is stretched around multiple rollers 21 to 26 (the number of rollers is six in the present exemplary embodiment). Among the rollers 21 to 26, the roller 21 is a driving roller used for the intermediate transfer belt 20. The roller 22 is a metallic idle roller used for positioning of the intermediate transfer belt 20 and for formation of a flat first transfer face. The roller 23 is a tension roller that is used to make a tension applied to the intermediate transfer belt 20 constant. The rollers 24 and 25 are driven rollers. The roller 26 is a backup roller that is used for second transfer, which is described below. Moreover, the intermediate transfer belt 20 is formed of a material that is obtained by causing a resin, such as polyimide, polycarbonate, polyester, polypropylene, polyethylene terephthalate, acryl, or vinyl chloride, various types of rubber, or the like to contain an appropriate amount of carbon black serving as a conductant agent. A belt that is formed of the material so as to have a surface resistivity of $10.8\pm0.6 \log \Omega/\square$, a volume resistivity of $10\pm2 \log \Omega\cdot cm$, and a thickness of $90\pm15$ μm is used as the intermediate transfer belt 20.

The second transfer part 30 includes a second transfer roller 31 that is disposed on a side of a face of the intermediate transfer belt 20 on which the toner images are held, the roller 26, and so forth. The roller 26 is formed of a tube that is made of rubber into which epichlorohydrin rubber and NBR are blended. The inside of the roller 26 is made of ethylene propylene diene monomer (EPDM) rubber. The roller 26 is formed so as to have a surface resistivity of $6.7\pm0.15 \log \Omega/\square$. The hardness of the roller 26 is set to 70° (ASKER C). A second transfer bias power supply (not illustrated) for applying a predetermined second transfer bias to the roller 26 is connected to a shaft portion of the roller 26. In contrast, the second transfer roller 31 is grounded.

In contrast, a belt cleaner 27 serving as a cleaner that removes residual toner adhering onto the intermediate transfer belt 20 after second transfer is performed is provided on the downstream side of the second transfer part 30. A sheet metal member 28 is disposed along the inner face of the intermediate transfer belt 20 at a position at which the sheet metal member 28 faces the belt cleaner 27 so that the intermediate transfer belt 20 is sandwiched therebetween. The belt cleaner 27 has a cleaning blade 41 that is made of urethane, and a cleaner housing 42 in which the cleaning blade 41 is accommodated. Furthermore, one end of the cleaning blade 41 is fixed by being inserted into a block 43. The block 43 is attached to a holder 44 that oscillates about a shaft 44a. Additionally, a spring 45 that urges the cleaning blade 41 toward the intermediate transfer belt 20 is attached between a recessed portion 44b, which is provided on the lower end side of the holder 44, and a protruding portion, which is provided on the bottom of the cleaner housing 42. A film seal 46 for reducing a splattering of removed foreign matter to the outside is attached on the upstream side of the moving direction of the intermediate transfer belt 20 when viewed from the cleaning blade 41.

Moreover, a cam, which is not illustrated, is connected to a cleaner driving motor (not illustrated). The holder 44 is urged or released from being urged by the cam in a direction that is opposite to the urging direction of the spring 45. Accordingly, the cleaning blade 41 can be in contact with or separated from the intermediate transfer belt 20. In the present exemplary embodiment, in a case of forming a color image having multiple colors, the second transfer roller 31 and the belt cleaner 27 are separated from the intermediate transfer belt 20 until toner images having the multiple colors prior to a toner image having the last color pass by the second transfer roller 31 and the belt cleaner 27.

Note that, in the image forming apparatus 1 in the present exemplary embodiment, a transfer unit that transfers toner images onto a sheet of paper is configured so as to include the intermediate transfer belt 20, the first transfer roller 15, and the second transfer roller 31.

Furthermore, the fixing part 50 includes a heating roller 51 in which a heating source such as a halogen lamp is incorporated, and a pressure roller 52 that is disposed so as to be pressed against the heating roller 51. A sheet of paper onto which toner images have been transferred is caused to pass through a fixing nip region that is formed between the heating roller 51 and the pressure roller 52, whereby fixing is performed.

The paper storage section 60 includes first to third storage parts 61A to 61C, drawing rollers 62A to 62C, and separating mechanisms 63A to 63C. The first to third storage parts 61A to 61C store the sheets of paper P1 to P3, which have different sizes, as sheets of paper P so that the sheets of paper P1 to P3 can be supplied to the process section 10. The first to third storage parts 61A to 61C have openings that are formed at the top thereof, and have a rectangular shape. The multiple sheets of paper P1 to P3 are stored inside the first to third storage parts 61A to 61C, respectively, as sheet stacks. The drawing rollers 62A to 62C contact the top sheets of paper P1 to P3 among the multiple sheets constituting the sheet stacks that are stored in the first to third storage parts 61A to 61C, respectively, and send out the top sheets of paper P1 to P3 toward the separating mechanisms 63A to 63C, respectively. Each of the separating mechanisms 63A to 63C includes, for example, a feed roller that is rotatable, and a retard roller whose rotation is regulated. The separating mechanisms 63A to 63C separate the sheets of paper P1 to P3, which have been sent out by the drawing rollers 62A to 62C, from each other, respectively.

The paper transport section 70 includes transport rollers 71 and so forth, and can transport the sheets of paper P1 to P3, which have been supplied from the paper storage section 60, to the process section 10.

The image forming unit 2 in the present exemplary embodiment can perform a print job that the system control unit 6 has obtained via the communication line L, and can perform an image forming process for image data that has been transmitted from the image reading unit 3. Various types of operations and data processing that are performed in the image forming unit 2 are controlled by the image forming controller 201.

Description of Image Reading Unit

Figure 2:
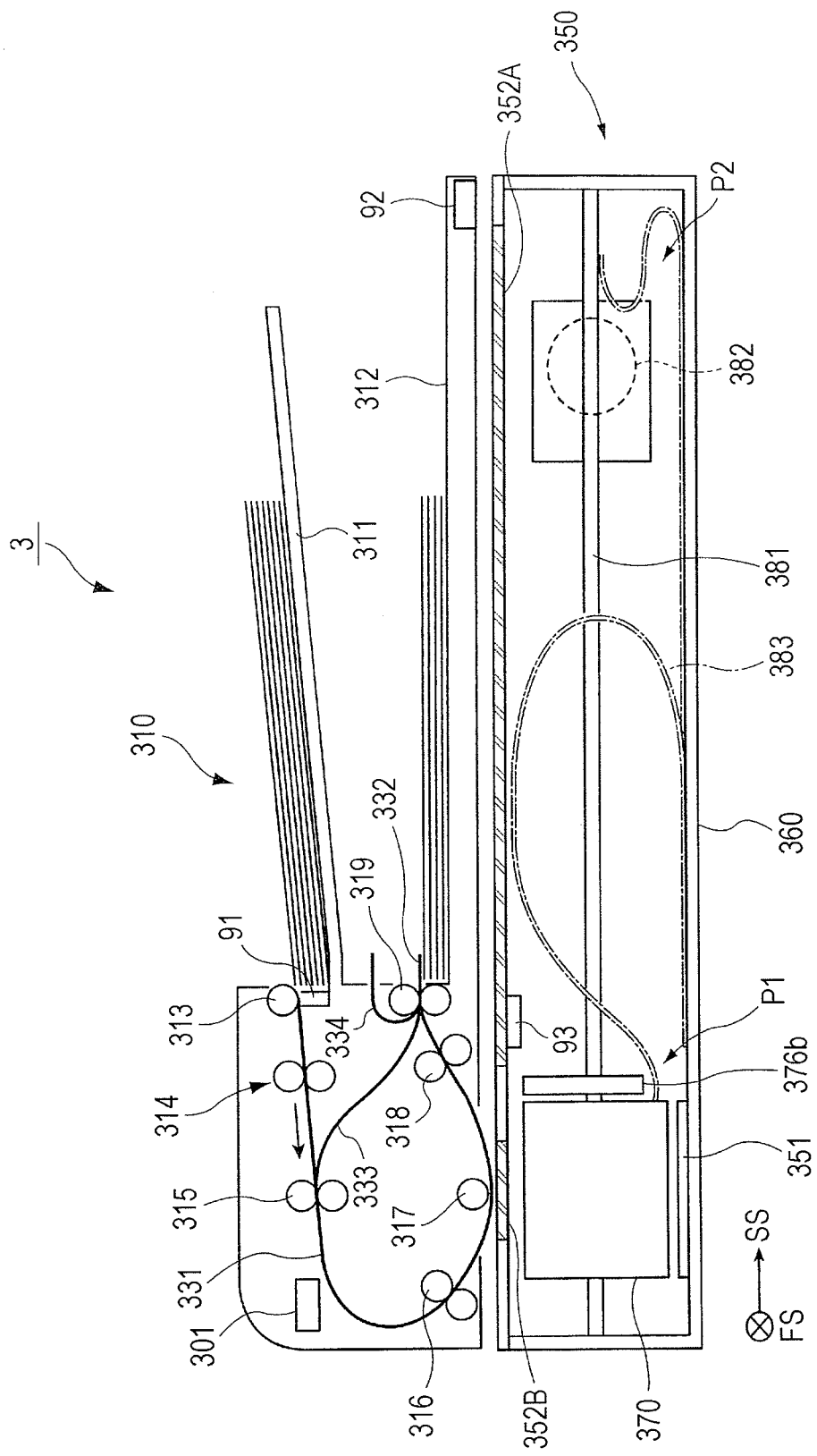
FIG. 2 is a diagram illustrating an example of a configuration of the image reading unit in the present exemplary embodiment.

FIG. 2 is a diagram illustrating an example of a configuration of the image reading unit 3 in the present exemplary embodiment. The image reading unit 3 illustrated in FIG. 2 can read an image formed on a fixed document, and can also read an image formed on a document that has been transported. The image reading unit 3 includes a reading device 350 and a document sending device 310. The reading device 350 serves as an example of a reading section that generates image data (image information) by reading an image formed on a document, and that sends the image data to the image forming unit 2. The document sending device 310 serves as an example of a document sending section that separates documents constituting a supported document stack from each other, and that sequentially transports the documents to the reading device 350.

The document sending device 310 includes a document support part 311 and a paper output support part 312. On the document support part 311, a document stack constituted by multiple documents is supported. The paper output support part 312 is provided below the document support part 311, and on the paper output support part 312, documents that have been read are supported. Furthermore, the document sending device 310 further includes a paper transport roller 313 that takes out the documents which are supported on the document sending device 310 and that transports the documents. Moreover, a separating mechanism 314 that separates the documents from each other using a feed roller and a retard roller is provided on the downstream side of the document transporting direction of the paper transport roller 313. A pre-registration roller 315, a registration roller 316, a platen roller 317, and an out roller 318 are provided sequentially from the upstream side of the document transporting direction along a first transport path 331 along which the documents are transported.

Additionally, the document sending device 310 further includes a document sending controller 301. The document sending controller 301 controls operations of the individual parts that are performed in a document sending operation of the document sending device 310.

The pre-registration roller 315 transports each of the documents, which have been separated from each other, to the rollers that are provided on the downstream side, and performs formation of a loop of the documents. The registration roller 316 restarts rotating in accordance with timing after the registration roller 316 stops rotating once, thereby supplying each of the documents while adjusting registration (for displacement) for the reading device 350, which is described below. The platen roller 317 assists transport of the document being read by the reading device 350. The out roller 318 transports the document, which has been read by the reading device 350, to the further downstream side. Furthermore, a second transport path 332 for guiding the document to the paper output support part 312 is provided at a position that is located further downstream from the out roller 318 on the downstream side of the document transporting direction. An ejection roller 319 is provided along the second transport path 332.

Moreover, in the document sending device 310, a third transport path 333 is provided between the output side of the out roller 318 and the input side of the pre-registration roller 315 so that images which are formed on both sides of a document can be read by one process. Note that the above-described ejection roller 319 also has a function of reversing and transporting a document along the third transport path 333.

Additionally, in the document sending device 310, a fourth transport path 334 for reversing a document again and outputting the document to the paper output support part 312 in a case of outputting the document when both sides of the document have been read is provided. The fourth transport path 334 is provided above the second transport path 332. The above-described ejection roller 319 has also a function of reversing and transporting a document along the fourth transport path 334.

In contrast, the reading device 350 supports the above-described document sending device 310 so that the document sending device 310 can be open and closed, and supports the document sending device 310 with a device frame 360. Furthermore, the reading device 350 performs reading of an image formed on a document that has been transported by the document sending device 310. The reading device 350 includes the device frame 360, a first platen glass 352A, and a second platen glass 352B. The device frame 360 forms a housing. On the first platen glass 352A, a document having an image to be read is placed in a state in which the document is held still. The second platen glass 352B has an opening for light that is used to read a document which has been transported by the document sending device 310. Here, the second platen glass 352B is formed of, for example, a transparent glass plate having a long plate-like structure.

Additionally, the reading device 350 includes a reading unit 370, a guide shaft 381, and a driving motor 382. The reading unit 370 is disposed inside the device frame 360. The guide shaft 381 guides the reading unit 370 in a sub-scanning direction SS and a direction opposite to the sub-scanning direction SS inside the device frame 360. The driving motor 382 causes the reading unit 370 to move along the guide shaft 381. Furthermore, the reading device 350 includes a cable unit 383. One end of the cable unit 383 is connected to the device frame 360, and the other end of the cable unit 383 is connected to the reading unit 370. The cable unit 383 transmits and receives power or signals between the cable unit 383 and the reading unit 370. Here, a light-receiving-side substrate 376b that is provided on the reading unit 370 is positioned on the end portion of the reading unit 370 on the downstream side of the sub-scanning direction SS.

Moreover, the reading device 350 further includes a reading controller 351. Image data regarding an image formed on a document is input from the reading unit 370, and the reading controller 351 performs predetermined processing for the image data. Additionally, the reading controller 351 controls operations of the individual parts that are performed in a read operation of the image reading unit 3.

In a normal case, the reading unit 370 is positioned at a reference position P1 which is located below the second platen glass 352B. Then, in a case in which a document having an image to be read is placed on the first platen glass 352A in a state in which the document is held still, the reading unit 370 moves in the sub-scanning direction SS in association with a reading operation of reading the document, thereby reaching an end position P2 that is located on the most downstream side of the sub-scanning direction SS. Then, the reading unit 370 returns to the reference position P1. In contrast, in a case of reading a document that has been transported by the document sending device 310, the reading unit 370 reads the document while being held still at the reference position P1. Note that, in the description given below, a direction from the front side to the rear side in the figures is referred to as a "main scanning direction FS".

Figure 3:
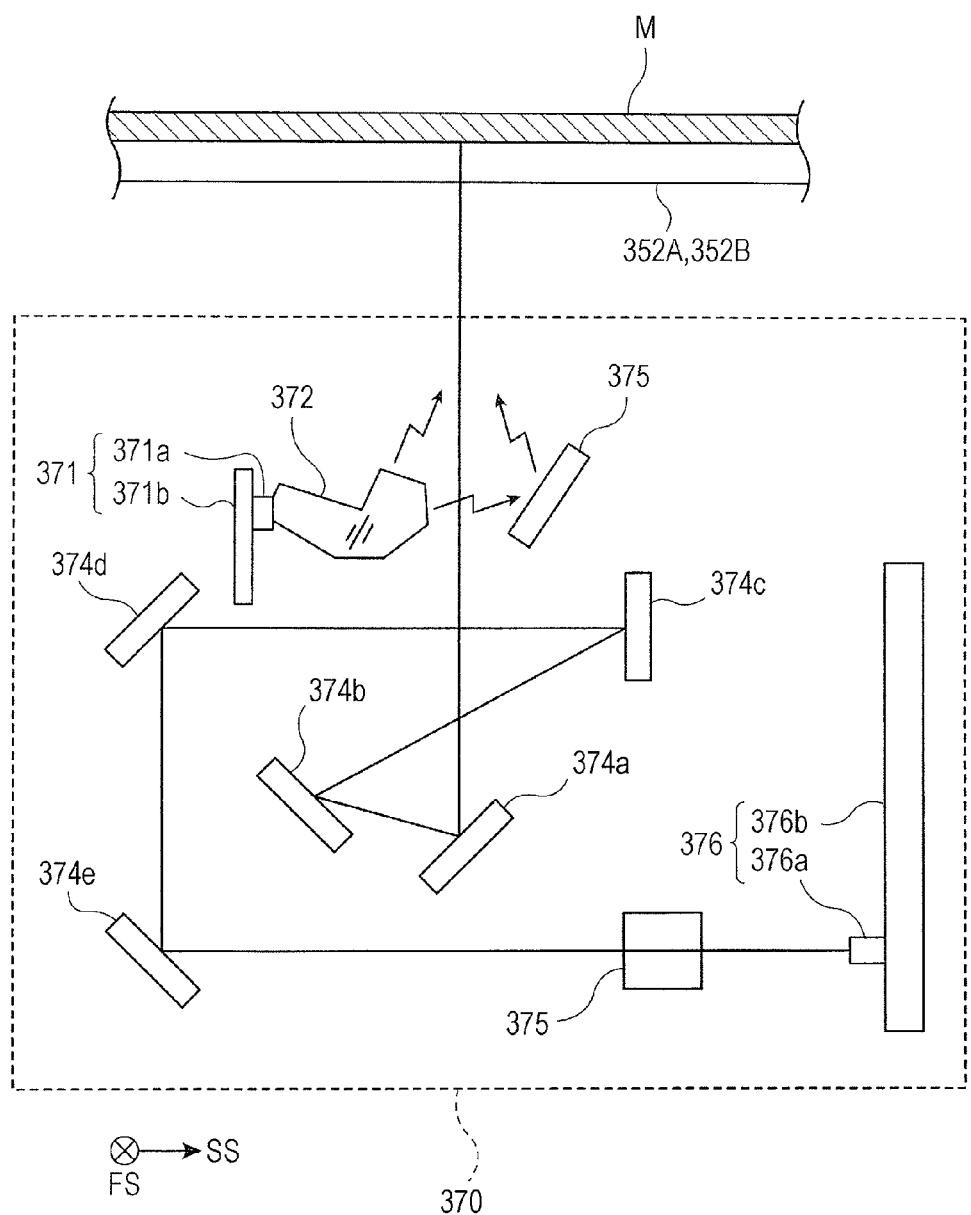
FIG. 3 is a diagram illustrating an example of a configuration of a reading optical system that is provided in a reading unit.

FIG. 3 is a diagram illustrating an example of a configuration of a reading optical system that is provided in the reading unit 370.

The reading optical system includes a light emitting part 371, a light guide member 372, and a reflector 373. The light emitting part 371 emits visible light. The light guide member 372 guides the light, which has been output from the light emitting part 371, to the first platen glass 352A and the second platen glass 352B (hereinafter, referred so as the "first platen glass 352A and so forth") and to the reflector 373, which is described below. The reflector 373 reflects a portion of the light, which has been output from the light emitting part 371 via the light guide member 372, to the first platen glass 352A and so forth. Furthermore, a document M is irradiated with the light, which has been output from the light emitting part 371, via the first platen glass 352A and so forth. The light is reflected by the document M, and the reflected light passes through the first platen glass 352A and so forth. The reading optical system further includes a first mirror 374a, a second mirror 374b, a third mirror 374c, a fourth mirror 374d, and a fifth mirror 374e that sequentially reflect the reflected light. Moreover, the reading optical system includes a lens 375 and a light receiving part 376. The lens 375 gathers the light that has been reflected by the fifth mirror 374e. Imaging is performed by gathering the light using the lens 375, and the light receiving part 376 receives the gathered light. A so-called folding optical system, in which paths along which the light reflected by the document M passes intersect with each other, is used as the reading optical system in the present exemplary embodiment. Accordingly, miniaturization of the reading unit 370 is achieved.

The light emitting part 371 includes a light-emitting-element array 371a and a light-emitting-side substrate 371b. In the light-emitting-element array 371a, multiple light emitting elements (e.g., light emitting diodes (LEDs)) are arranged along the main scanning direction FS. On the light-emitting-side substrate 371b, the light-emitting-element array 371a is mounted, and the light-emitting-side substrate 371b is fixed on the reading unit 370.

Additionally, the light receiving part 376 includes a light-receiving-element array (e.g., a charge coupled device (CCD) image sensor) 376a and the light-receiving-side substrate 376b. In the light-receiving-element array 376a, multiple light receiving elements are arranged along the main scanning direction FS. On the light-receiving-side substrate 376b, the light-receiving-element array 376a is mounted, and the light-receiving-side substrate 376b is fixed on the reading unit 370. The light-receiving-side substrate 376b is positioned on an end portion of the reading unit 370 on the downstream side of the sub-scanning direction SS, as also illustrated in FIG. 3.

Description of Detector

In the document sending device 310 in the present exemplary embodiment, a document support sensor 91 and an open/closed-state sensor 92 are provided as examples of a detector that detects a state of the image reading unit 3. The document support sensor 91 detects whether or not a document exists in a case of supporting a document on the document sending device 310. The open/closed-state sensor 92 detects opening/closing of the document sending device 310. Furthermore, in the reading device 350, similarly, a document sensor 93 that detects whether or not a document exists on the first platen glass 352A is provided as an example of the detector.

Here, a case in which a detection signal is detected by the document support sensor 91 corresponds to a case in which a document is supported on the document sending device 310. Furthermore, a case in which a detection signal is detected by the open/closed-state sensor 92 corresponds to, for example, a case in which a user changes the document sending device 310 from being in a state in which the document sending device 310 is open to a state in which the document sending device 310 is closed. Moreover, when a case in which a detection signal is detected by the document sensor 93 corresponds to, for example, a case in which a user has placed a document on the first platen glass 352A of the reading device 350.

Description of System Control Unit

Next, control that the system control unit 6 performs on the individual units will be described.

Figure 4:
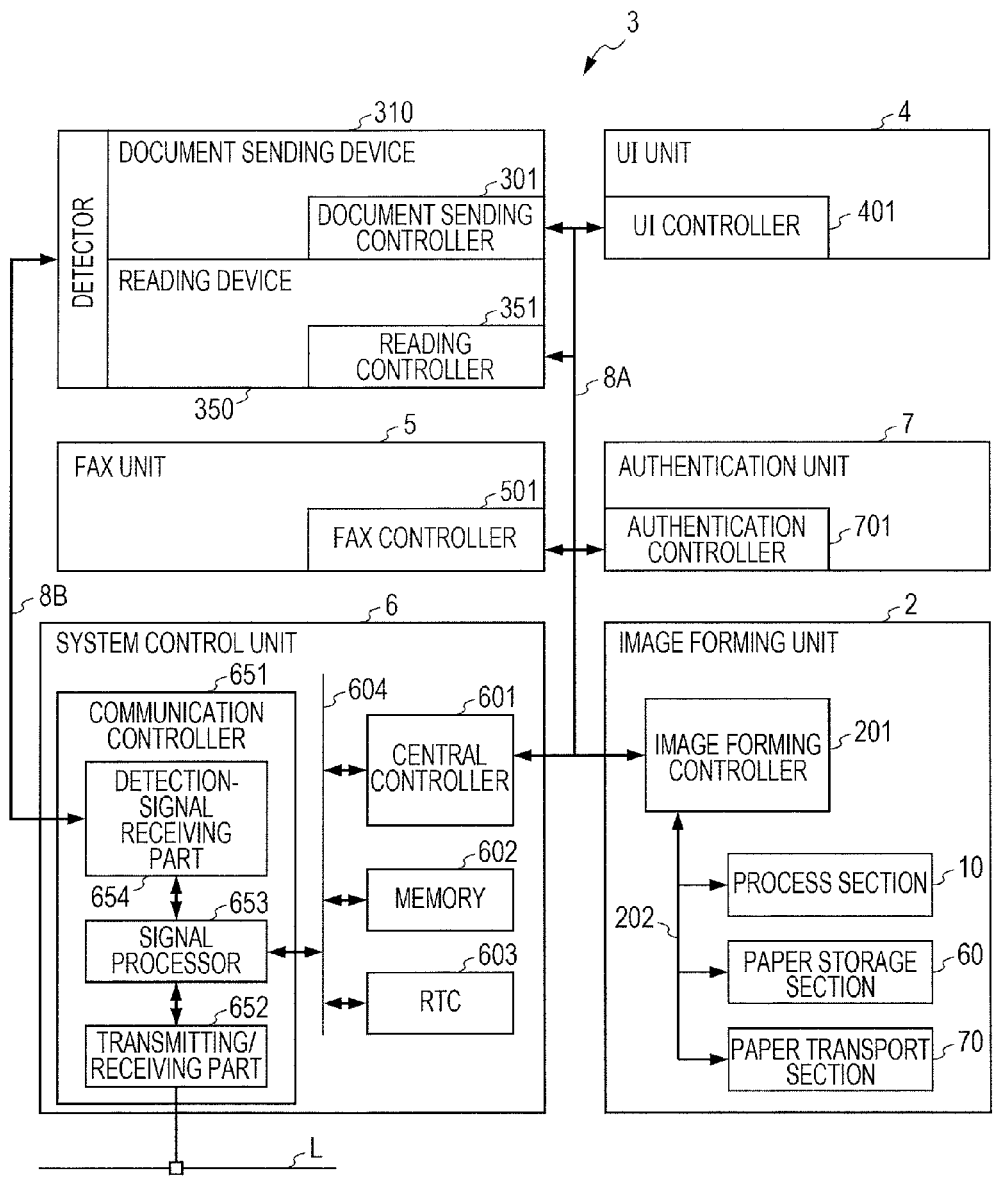
FIG. 4 is a diagram illustrating an internal configuration of a system control unit and a communication configuration between the system control unit and individual units.

FIG. 4 is a diagram illustrating an internal configuration of the system control unit 6 and a communication configuration between the system control unit 6 and the individual units. As illustrated in FIG. 4, the system control unit 6 includes a central controller 601, a communication controller 651, a memory 602, and a real-time clock (RTC) 603. The central controller 601 serves as an example of a main control section that controls an operation of the entire image forming apparatus 1. The communication controller 651 is connected to the communication line L that is configured using a network such as a local area network (LAN), a wide area network (WAN), or the Internet. The memory 602 serves as an example of a storage section that stores, for example, various data for performing image formation with the image forming unit 2. The RTC 603 measures a date and time. The individual sections are connected to each other using an internal bus 604.

The controllers to which the system control unit 6 is connected using a unit-to-unit communication line 8A are as follows: the image forming controller 201 that controls an operation of the image forming unit 2; the document sending controller 301 that controls an operation of the document sending device 310 of the image reading unit 3; the reading controller 351 that controls an operation of the reading device 350 of the image reading unit 3; a UI controller 401 that controls an operation of the UI unit 4; a FAX controller 501 that controls an operation of the FAX unit 5; and an authentication controller 701 that controls an operation of the authentication unit 7. Accordingly, the system control unit 6 performs integrated control of the image forming controller 201, the document sending controller 301, the reading controller 351, the UI controller 401, the FAX controller 501, and the authentication controller 701 so that the controllers are in operated in an organic, continuous, and unified manner.

Here, as illustrated in FIG. 4, in the image forming unit 2, the image forming controller 201 and the process section 10, the paper storage section 60, and the paper transport section 70, which serve as component members are connected to each other using an in-unit communication line 202. The image forming controller 201 controls the process section 10, the paper storage section 60, and the paper transport section 70.

Furthermore, the system control unit 6 controls communication between the image forming apparatus 1 and an external apparatus. The communication controller 651 of the system control unit 6 includes a transmitting/receiving part 652 and a signal processor 653. The transmitting/receiving part 652 is connected to the communication line L, and performs transmission/reception of a signal to/from the communication line L. The signal processor 653 performs predetermined processing for a signal that has been transmitted/received. The transmitting/receiving part 652 receives a signal such as a print job transmitted via the communication line L. Then, the transmitting/receiving part 652 converts the received signal (the print job) from an analog signal to a digital signal (a packet) constituted by data streams represented by "0" and "1. The transmitting/receiving part 652 transmits the digital signal to the signal processor 653. The signal processor 653 determines whether or not the destination address of the packet, which has been received from the transmitting/receiving part 652, coincides with address information (identification information) such as a medium access control (MAC) address of the image forming apparatus 1. Then, the communication controller 651 transmits, to the central controller 601 via the internal bus 604, the packet (the print job) having a destination address that coincides with the MAC address of the image forming apparatus 1. The central controller 601 transmits the print job, which has been transmitted from the communication controller 651, to the image forming unit 2 via the unit-to-unit communication line 8A.

Additionally, the communication controller 651 of the system control unit 6 is connected to the document support sensor 91, the open/closed-state sensor 92, and the document sensor 93, which constitute the detector, (hereinafter, collectively referred to as a "detector") using a dedicated line 8B. In other words, the communication controller 651 is connected to the detector, the central controller 601, and the communication line L. The dedicated line 8B is connected to a detection-signal receiving part 654 of the communication controller 651. With this configuration, via the detection-signal receiving part 654, the communication controller 651 can directly receive a detection signal indicating a state of the image reading unit 3, which has been transmitted from the document support sensor 91, the open/closed-state sensor 92, or the document sensor 93, in a first operating state in which supply of power to the central controller 601 is stopped, which is described below.

Moreover, the system control unit 6 controls operating modes (operating states) of the image forming apparatus 1. In the present exemplary embodiment, the central controller 601 included in the system control unit 6 controls supply of power from the power supplying unit 80 (see FIG. 1) in accordance with, for example, reception of a print job that has been transmitted from the communication line L, a state of the image reading unit 3 that has been detected by the detector, or the like, thereby controlling operating states of the individual units of the image forming apparatus 1.

Description of Operating Modes of Image Forming Apparatus

Here, operating modes, which are controlled by the system control unit 6, of the image forming apparatus 1 will be described.

FIG. 5 is a diagram for explaining operating modes that are set in the image forming apparatus 1 to which the image reading unit 3 in the present exemplary embodiment is applied. As illustrated in FIG. 5, operating modes in which the amounts of power consumption are different are set in the image forming apparatus 1 in accordance with various operating states. More specifically, the system control unit 6 selectively sets an operating mode among a "copy mode", a "print mode", a "scan mode", a "standby mode", and a "sleep mode. Note that, in the description given below, the term "first operating state" refers to a state in which supply of power to the central controller 601 is stopped, and the term "second operating state" refers to a state in which power is supplied to the central controller 601.

The copy mode is an operating state in which image data is generated by reading an image formed on a document with the image reading unit 3, and in which image formation is performed by the image forming unit 2 on the basis of the image data. The copy mode is an example of the second operating state. In the copy mode, power is supplied from the power supplying unit 80 to all of the image forming unit 2, the image reading unit 3, the UI unit 4, the FAX unit 5, the system control unit 6, the authentication unit 7, and the detector that are included in the image forming apparatus 1. Accordingly, power for performing an image forming operation and for handling, for example, an input of image data from the image reading unit 3 is supplied.

The print mode is an operating state in which, when a print job transmitted from the communication line L has received, image forming is performed by the image forming unit 2 on the basis of image data transmitted from the communication line L. The print mode is an example of the second operating state. In the print mode, power is supplied from the power supplying unit 80 to the image forming unit 2, the UI unit 4, the FAX unit 5, the system control unit 6, the authentication unit 7, and the detector. In contrast, supply of power to the image reading unit 3 that is not used is stopped.

The scan mode is an operating state in which image data is generated by reading an image formed on a document with the image reading unit 3. In this mode, image formation based on the image data is not performed. The image data is transmitted via the communication controller 651 to an external apparatus such as a terminal apparatus specified by a user who has scanned the document. The scan mode is an example of the second operating state. In the scan mode, power is supplied from the power supplying unit 80 to the sections excluding the image forming controller 201 among the sections of the image forming unit 2, the image reading unit 3, the UI unit 4, the FAX unit 5, the system control unit 6, the authentication unit 7, and the detector. In contrast, supply of power to the image forming controller 201 among the sections of the image forming unit 2 is stopped.

The standby mode is an operating state in which an on-demand input such as an input of image data is handled. The image forming apparatus 1 shifts from the standby mode to one of the copy mode, the print mode, and the scan mode, which are described above, in accordance with an input such as a print job. The standby mode is an example of the second operating state. In the standby mode, power is supplied from the power supplying unit 80 to the sections excluding the image forming controller 201 among the sections of the image forming unit 2, the UI unit 4, the FAX unit 5, the system control unit 6, the authentication unit 7, and the detector. In contrast, supply of power to the image forming controller 201 among the sections of the image forming unit 2 and the image reading unit 3 is stopped.

The sleep mode is an operating state that is set in a case in which an input such as a print job is not provided, for example, even when a predetermined time t1 elapses. The sleep mode is an example of the first operating state. In the sleep mode, power is supplied from the power supplying unit 80 to the FAX unit 5, the communication controller 651 included in the system control unit 6, and the detector. In contrast, supply of power to the image forming unit 2, the image reading unit 3, the UI unit 4, the system control unit 6 excluding the communication controller 651, and the authentication unit 7 is stopped.

As described above, in the present exemplary embodiment, supply of power to the individual units included in the image forming apparatus 1 is stopped in accordance with the operating states of the image forming apparatus 1. Accordingly, power consumed by the unused units can be reduced. Thus, the image forming apparatus 1 can be operated with lower power consumption.

Next, a procedure by which the central controller 601 included in the system control unit 6 performs control of the above-described operating modes will be described.

Figure 6:
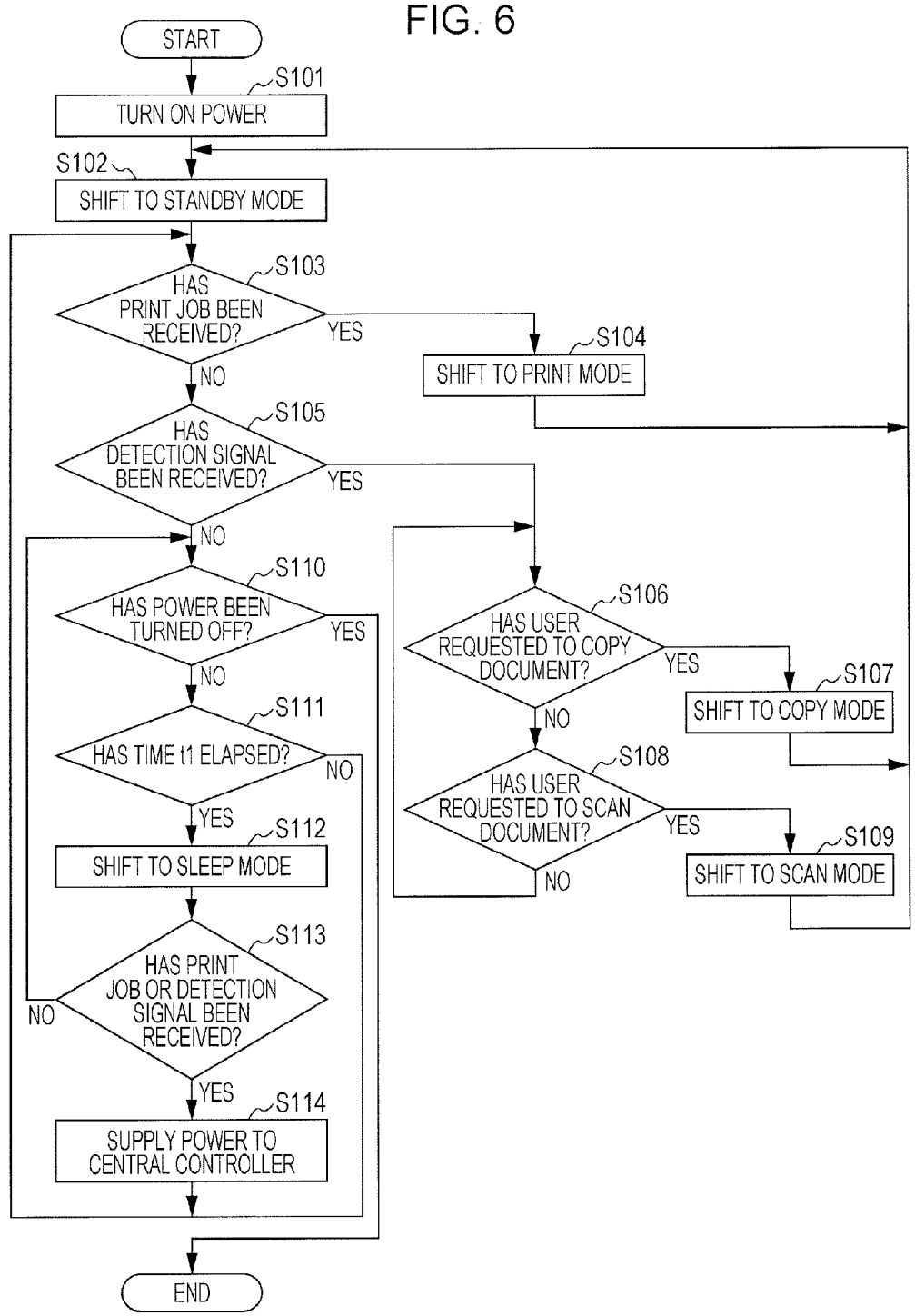
FIG. 6 is a flow diagram for explaining a procedure by which a central controller performs control of the operating modes.

FIG. 6 is a flow diagram for explaining a procedure by which the central controller 601 performs control of the operating modes.

First, when power for the central controller 601 is turned on (step S101), the central controller 601 of the system control unit 6 causes the image forming apparatus 1 to shift to the standby mode (step S102).

Next, the central controller 601 determines whether or not the communication controller 651 has received a print job transmitted from the communication line L (step S103). When the communication controller 651 has received a print job (YES in step S103), the central controller 601 causes the image forming apparatus 1 to shift to the print mode, and performs image formation on the basis of image data transmitted from the communication line L (step S104). After the image formation finishes, the central controller 601 returns to step S102.

Moreover, when the communication controller 651 has not received a print job (NO in step S103), the central controller 601 determines whether or not a detection signal transmitted from the detector to the central controller 601 has been received (step S105). Note that, in this case, the detector transmits a detection signal to the central controller 601 using the unit-to-unit communication line 8A.

When the central controller 601 has received a detection signal transmitted from the detector (YES in step S105), the central controller 601 determines whether or not a user who uses the image forming apparatus 1 has requested to copy a document (step S106).

When the user has requested to copy a document (YES in step S106), the central controller 601 causes the image forming apparatus 1 to shift to the copy mode, and performs image formation on the basis of image data transmitted from the image reading unit 3 (step S107).

Furthermore, when the user has not requested to copy a document (NO in step S106), the central controller 601 determines whether or not the user who uses the image forming apparatus 1 has requested to scan a document (step S108). When the user has requested to scan a document (YES in step S108), the central controller 601 causes the image forming apparatus 1 to shift to the scan mode, and receives image data transmitted from the image reading unit 3 (step S109).

In contrast, when a detection signal transmitted from the detector to the central controller 601 has not been received (NO in step S105), the central controller 601 determines whether or not power for the image forming apparatus 1 has been turned off (step S110). When power for the image forming apparatus 1 has been turned off (YES in step S110), the central controller 601 finishes the process.

Additionally, when power for the image forming apparatus 1 has not been turned off (NO in step S110), the central controller 601 determines whether or not the predetermined time t1 has elapsed since a process such as an image forming process performed last (step S111). When the time t1 has not elapsed (NO in step S111), the central controller 601 returns to step S103. However, when the time t1 has elapsed (YES in step S111), the central controller 601 causes the image forming apparatus 1 to shift to the sleep mode (step S112).

In this case, supply of power to the central controller 601 is also stopped. Accordingly, after that, the communication controller 651 continues monitoring a signal transmitted from the communication line L or a detection signal transmitted from the detector. Then, the communication controller 651 determines whether or not the communication controller 651 has received a print job from the communication line L and whether or not the communication controller 651 has received a detection signal transmitted from the detector to the communication controller 651 (step S113). When the communication controller 651 has received one of the signals given above (YES in step S113), power is supplied to the entire system control unit 6 including the central controller 601 (step S114). Thereafter, the central controller 601 returns to step S103. In other words, the central controller 601 is caused to shift from the first operating state, in which supply of power is stopped, to the second operating state, in which power is supplied. After that, the central controller 601 causes the image forming apparatus 1 to shift from the sleep mode to one of the print mode, the copy mode, and the scan mode. Note that, in this case, the detector transmits a detection signal to the communication controller 651 using the dedicated line 8B.

As described above, in the present exemplary embodiment, power is supplied to the detector and the communication controller 651 in both the first operating state, in which supply of power to the central controller 601 is stopped, and the second operating state, in which power is supplied to the central controller 601. In the first operating state in which supply of power to the central controller 601 is stopped, the detector transmits a detection signal to the communication controller 651 using the dedicated line 8B. In the second operating state in which power is supplied to the central controller 601, the detector transmits a detection signal to the central controller 601 using the unit-to-unit communication line 8A. When the communication controller 651 receives a detection signal from the detector in the first operating state, the communication controller 651 causes the central controller 601 to shift from the first operating state to the second operating state.

As described above, because the detector is provided, the operating mode can be quickly shifted from the first operating state, such as the sleep mode, in which supply of power to the central controller 601 is stopped, to the second operating state, in which power is supplied. In other words, in any case in which a detection signal is detected by the detector, an operation for copying or scanning a document is performed using the image reading unit 3 by a user. Accordingly, the operating mode of the image forming apparatus 1 can be quickly made to match with an operation of the image forming apparatus 1 that is requested by the user. In contrast, in a case in which the detector does not exist or in which supply of power to the detector is stopped in the sleep mode, in order to shift the operating mode from the sleep mode to each of the operating modes, for example, the user needs to perform an operation of pressing a power-saving return switch or the like. Thus, the quickness and user-friendliness are reduced.

Furthermore, in the present exemplary embodiment, the detector and the communication controller 651 are connected to each other using the dedicated line 8B. First, the communication controller 651 receives a detection signal transmitted from the detector. Accordingly, in the sleep mode, the communication controller 651 can monitor a print job transmitted from the communication line L, and can also monitor a detection signal transmitted from the detector. Thus, in the system control unit 6, it is only necessary to supply power to the communication controller 651, and it is not necessary to supply power to the central controller 601 and so forth. Therefore, in a sleep state, a power saving effect is larger, compared with that in a case in which the central controller 601 monitors a detection signal transmitted from the detector.

Note that it may be considered that an image reading apparatus according to the present exemplary embodiment is configured so as to include the document sending device 310, the reading device 350, the central controller 601, the detector, and the communication controller 651, which are described above.

Moreover, it may be considered that the communication controller 651 in the present exemplary embodiment, which is described above, is a control apparatus having the following features: the control apparatus includes the transmitting/receiving part 652 and the detection-signal receiving part 654; the transmitting/receiving part 652 is connected to the communication line L, and performs transmission/reception of a signal to/from the communication line L; the detection-signal receiving part 654 receives a detection signal indicating a state of the image reading unit 3 in the first operating state in which supply of power to the central controller 601 is stopped; and, when the detection-signal receiving part 654 receives the detection signal, the control apparatus causes the central controller 601 to shift from the first operating state to the second operating state, in which power is supplied.

Additionally, the process performed by the communication controller 651, which is described with reference to FIG. 6, is realized by cooperation between software and hardware resources. In other words, a control computer is provided in the communication controller 651, and a central processing unit (CPU) that is not illustrated is provided inside the computer. The CPU executes a program for realizing the individual functions of the transmitting/receiving part 652, the signal processor 653, the detection-signal receiving part 654, and so forth that are included in the communication controller 651, thereby realizing the individual functions of the parts.

Accordingly, the program for realizing the process performed by the communication controller 651, which is described with reference to FIG. 6, can be considered as a program for causing the computer to realize the following functions: a function of performing transmission/reception of a signal to/from the communication line L; a function of receiving a detection signal indicating a state of the image reading unit 3 in the first operating state in which supply of power to the central controller 601 is stopped; and a function of causing, when the detection signal is received, the central controller 601 to shift from the first operating state to the second operating state, in which power is supplied.

Description of Other Application of Detector

Furthermore, the above-described detector may be used for other application. The detector may be used for application of provision of a notification to a user, for example, when the user has left a document on the reading device 350 of the image reading unit 3.

FIG. 7 is a flow diagram for explaining a case in which a notification is provided from the image forming apparatus 1 to a user when the user has left a document on the reading device 350 of the image reading unit 3.

First, for a user who desires to use the image forming apparatus 1, authentication of the user is performed by the authentication unit 7 (step S201). Next, a process such as a copy or scan process using the image reading unit 3 is performed by the user (step S202).

Then, after the process finishes, the communication controller 651 determines, using the document sensor 93, whether or not a document exists on the first platen glass 352A (step S203). When the user has removed a document from the first platen glass 352A, i.e., when no document exists on the first platen glass 352A, (NO in step S203), the communication controller 651 finishes the process. Moreover, when a document exists on the first platen glass 352A (YES in step S203), the communication controller 651 determines whether or not a predetermined time t2 has elapsed since the above-described process performed by the user finished (step S204). When the time t2 has elapsed (YES in step S204), the communication controller 651 determines that the user has left a document, and transmits a notification saying so to the central controller 601 (step S205).

Then, the central controller 601 obtains, for example, an internet protocol (IP) address as information for specifying a terminal apparatus, such as a personal computer (PC), that is used by the user who has been authenticated by the authentication unit 7 (step S206). The central controller 601 may obtain the IP address from an external apparatus via the communication controller 651. Alternatively, the IP address may be stored in advance in a memory, such as a hard disk (HDD), that is included in the image forming apparatus 1 and that is not illustrated, and the central controller 601 may obtain the IP address from the memory. Then, the central controller 601 transmits, via the communication controller 651 to the terminal apparatus used by the user, a message saying that a document has been left (step S207). In other words, in the present exemplary embodiment, when the detector detects that a document has existed on the reading device 350 for a predetermined time or longer, the central controller 601 provides, using the communication line L, a notification via the communication controller 651 to the user who has been authenticated by the authentication unit 7.

In the present exemplary embodiment, the time t2 may be set as a time at which the image forming apparatus 1 is caused to shift from the standby mode to the sleep mode. However, the time t2 is not limited thereto. For example, the time t2 may be a time that has elapsed since the image forming apparatus 1 shifted to the sleep mode. In other words, even in the sleep mode, because power is supplied to the communication controller 651 and the detector, the process described with reference to FIG. 7 can be performed. In this case, in step S205, because the central controller 601 is in the first operating state in which supply of power is stopped, the communication controller 651 causes the central controller 601 to shift from the first operating state to the second operating state, in which power is supplied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus used for an image forming apparatus (i) that is coupled to the image reading apparatus and (ii) that has a main controller which performs control of the image forming apparatus, the image reading apparatus comprising:
   an image reading unit configured to read an image formed on a document;
   a detector configured to detect a state of the image reading unit and configured to generate a detection signal in response to the detected state of the image reading unit; and
   a communication controller configured to connect to the main controller of the image forming apparatus, the detector, and a communication line,
   wherein power is supplied to the detector and the communication controller in both a first operating state, in which supply of power to the main controller is stopped, and a second operating state, in which power is supplied to the main controller, wherein the detector is configured to transmit the detection signal to the communication controller in the first operating state, and configured to transmit the detection signal to the main controller in the second operating state without using the communication controller as an intermediary, and
   wherein the detection signal is not transmitted to the communication controller in the second operating state.

2. The image reading apparatus according to claim 1, wherein the communication controller is configured to cause, in response to receiving the detection signal from the detector in the first operating state, the main controller to shift from the first operating state to the second operating state.

3. The image reading apparatus according to claim 1,
   wherein the image reading unit includes a reading part configured to generate image information by reading the image formed on the document and configured to transmit the image information to an image forming unit, and includes a document sending part that is configured to sequentially transport documents to the reading part, and
   wherein the detector (i) is configured to detect whether or not a document exists on the reading part and the document sending part and (ii) configured to detect opening/closing of the document sending part.

4. The image reading apparatus according to claim 2,
   wherein the image reading unit includes a reading part generates configured to generate image information by reading the image formed on the document and configured to transmit the image information to an image forming unit, and includes a document sending part that is configured to sequentially transport documents to the reading part, and
   wherein the detector (i) is configured to detect whether or not a document exists on the reading part and the document sending part and (ii) configured to detect opening/closing of the document sending part.

5. The image reading apparatus according to claim 1, further comprising an authentication unit configured to perform authentication of a user intending to use the image reading apparatus,
   wherein, in response to the detector detecting that a certain time has elapsed since a document has existed on a reading part of the image reading unit, the main controller is configured to provide, via the communication controller, a notification to a terminal of the authorized user that the document has been left on the reading part.

6. The image reading apparatus according to claim 2, further comprising an authentication unit configured to perform authentication of a user intending to use the image reading apparatus,
   wherein, in response to the detector detecting that a certain time has elapsed since a document has existed on a reading part of the image reading unit, the main controller is configured to provide, via the communication controller, a notification to a terminal of the authorized user that the document has been left on the reading part.

7. The image reading apparatus according to claim 3, further comprising an authentication unit configured to perform authentication of a user intending to use the image reading apparatus,
   wherein, in response to the detector detecting that a certain time has elapsed since a document has existed on the reading part, the main controller configured to provide, via the communication controller, a notification to a terminal of the authorized user that the document has been left on the reading part.

8. The image reading apparatus according to claim 4, further comprising an authentication unit configured to perform authentication of a user intending to use the image reading apparatus,
   wherein, in response to the detector detecting that a certain time has elapsed since a document has existed on the reading part, the main controller is configured to provide, via the communication controller, a notification to a terminal of the authorized user that the document has been left on the reading part.

9. A control apparatus comprising:
   a transmitting/receiving unit that is connected to a communication line and configured to perform transmission/reception of a signal to/from the communication line; and
   a detection-signal receiving unit configured to receive, in a first operating state in which supply of power to a main controller of an image forming apparatus is stopped while power is supplied to the transmitting/receiving unit and the detection-signal receiving unit, a detection signal from a detector indicating a state of an image reading apparatus coupled to the image forming apparatus,
   wherein the transmitting/receiving unit is configured to transmit, in response to the detection-signal receiving unit receiving the detection signal, the signal via the communication line to the main controller causing the main controller to shift from the first operating state to a second operating state in which power is supplied to the main controller, wherein the main controller is configured to receive, in the second operating state, the detection signal from the detector without using the detection-signal receiving unit as an intermediary, and wherein the detection signal is not received by the detection-signal receiving unit in the second operating state.

10. A control method comprising:

performing, using a transmission/reception unit, transmission/reception of a signal to/from a communication line;

receiving, using a receiving unit, a detection signal indicating a state of an image reading apparatus coupled to an image forming apparatus, the detection signal received in a first operating state in which supply of power to a main controller of the image forming apparatus is stopped while power is supplied to the transmission/reception unit and the receiving unit;

transmitting using the transmission/reception unit, in response to the receiving unit receiving the detection signal, the signal via the communication line to the main controller causing the main controller to shift from the first operating state to a second operating state in which power is supplied to the main controller; and receiving, using the main controller and without using the receiving unit as an intermediary while the main controller is in the second operating state, the detection signal indicating the state of the image reading apparatus, wherein the detection signal is not received by the receiving unit in the second operating state.

11. A non-transitory computer readable medium storing a program causing a computer to execute a process, the process comprising:

performing, using a transmission/reception unit, transmission/reception of a signal to/from a communication line;

receiving, using a receiving unit, a detection signal indicating a state of an image reading apparatus coupled to an image forming apparatus, the detection signal received in a first operating state in which supply of power to a main controller of the image forming apparatus is stopped while power is supplied to the transmission/reception unit and the receiving unit;

transmitting using the transmission/reception unit, in response to the receiving unit receiving the detection signal, the signal via the communication line to 'the main controller causing the main controller to shift from the first operating state to a second operating state in which power is supplied to the main controller; and receiving, using the main controller and without using the receiving unit as an intermediary while the main controller is in the second operating state, the detection signal indicating the state of the image reading apparatus, wherein the detection signal is not received by the receiving unit in the second operating state.

12. The non-transitory computer readable medium of claim 11, wherein the receiving using the receiving unit further comprises receiving the detection signal via a dedicated line connecting the receiving unit and the transmission/reception unit.

13. The control method of claim 10, wherein the receiving using the receiving unit further comprises receiving the detection signal via a dedicated line connecting the receiving unit and the transmission/reception unit.

14. The control apparatus of claim 9, wherein the detection-signal receiving unit is configured to receive the detection signal via a dedicated line connecting the detection-signal receiving unit and the transmitting/receiving unit.

15. The image reading apparatus of claim 1, wherein the detector is configured to transmit the detection signal to the communication controller in the first operating state via a dedicated line connecting the detector and the communication controller.

* * * * *